United States Patent [19]

Hardy

[11] 4,364,698
[45] Dec. 21, 1982

[54] HITCH PIN

[76] Inventor: Raymond S. Hardy, R.R. #1, Bronson, Iowa 51107

[21] Appl. No.: 188,353

[22] Filed: Sep. 18, 1980

[51] Int. Cl.³ .......................... B60D 1/02; F16B 19/00
[52] U.S. Cl. .................................... 411/351; 280/515; 411/500
[58] Field of Search ............... 280/515, 483, 484, 485, 280/486, 487, 488, 489; 267/138; 411/351, 352, 353, 511, 512, 513, 514, 515, 500; 24/201 LP; 403/220, 221, 222, 224, 225

[56] References Cited

U.S. PATENT DOCUMENTS

| | | | |
|---|---|---|---|
| 1,974,966 | 9/1934 | McClure | 280/515 |
| 2,827,303 | 3/1958 | Herbenar | 403/228 X |
| 2,940,785 | 6/1960 | Haushalter | 403/224 |
| 3,199,903 | 8/1966 | Wood | 403/224 |
| 3,961,813 | 6/1976 | Thomas | 403/225 X |

*Primary Examiner*—John A. Pekar
*Attorney, Agent, or Firm*—Robert W. Carlson

[57] ABSTRACT

This invention relates to a pin construction for use in hitch assemblies such as those used to connect various types of trailers to a vehicle.

5 Claims, 3 Drawing Figures

HITCH PIN

BACKGROUND

Trailer hitch assemblies of many types have been developed over the years for use with recreational vehicles and for use with industrial vehicles. The coupling members are subjected to considerable jolting and hammering during transit. This is true of both the ball type coupling means and the pin type coupling means. The usefulness of a hitch assembly could be extended, timewise, if the assembly were constructed in such a manner as to reduce wear on the coupling members by including means in the assembly to absorb the impact between members when in use.

It is well known in the art to provide some resilient mass to absorb shocks in a joint between two members as illustrated by Wood U.S. Pat. No. 3,199,903 and Haushalter U.S. Pat. No. 2,940,785.

More relevant to the present invention is the patent to Thomas 3,961,813 which discloses a trailer hitch assembly including means to absorb the shock between the pintle and the eye portion of the hitch. Such an assembly is rather costly to produce. Also, because of its construction it is not readily adapted for use with many vehicles and trailers.

It is therefore an object of this invention to provide a cushion hitch assembly having a long lifetime.

It is a further object of this invention to provide a hitch pin for use in a hitch assembly which is adapted to absorb impact shock.

Referring to the invention in more detail as described in the following specification and the accompanying drawing in which.

INVENTION

Figure 1:
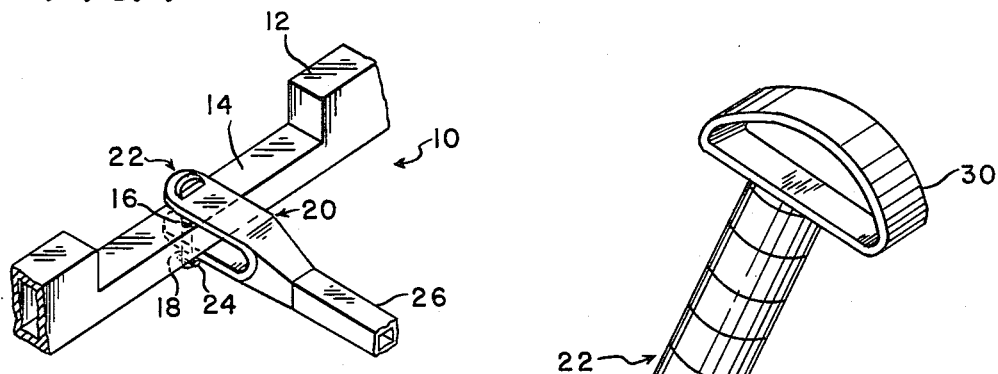
FIG. 1 is an elevational view of the assembly.
Figure 2:
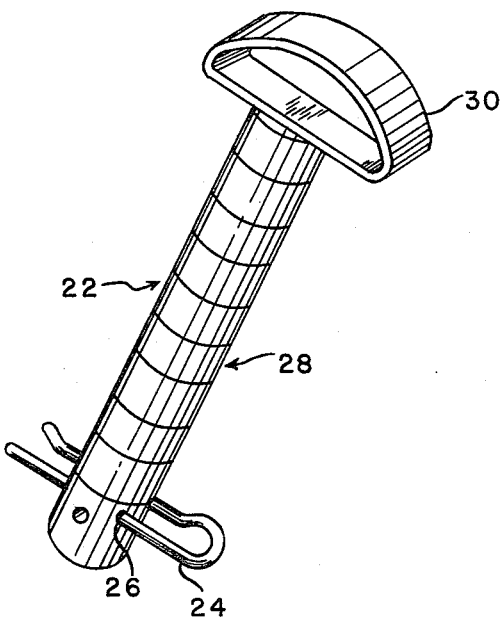
FIG. 2 is an elevational view of the hitch pin.
Figure 3:
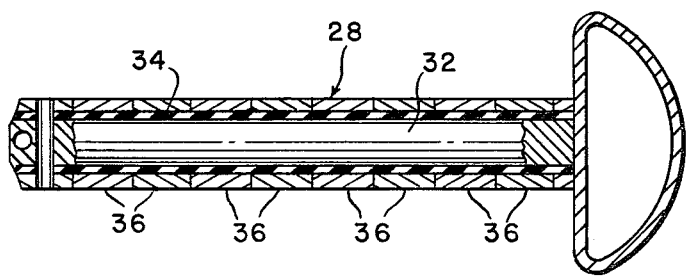
FIG. 3 is a sectional view of the hitch pin taken along line 3—3 of FIG. 2.

The hitch assembly 10 comprises a beam 12 which extends laterally of the rear end of a vehicle and is secured thereto by means of welding or by being bolted thereto. The beam is illustrated as being hollow but may be of a solid metal bar if so desired. A longitudinally extending cavity 14 is provided in the upper surface of the beam 12. Substantially in the center of the cavity 14 there are provided a pair of aligned openings 16 and 18.

The holes in the clevis 20 are aligned with the openings 16 and 18 and the hitch pin 22 is inserted therethrough. A cotter pin 24 is inserted through a bore 26 extending laterally through the bottom of the hitch pin 22 to secure the members together.

The clevis 20 is suitably connected to the draw bar 26 of the trailing vehicle.

The hitch pin 22 comprises a shaft 28 and a hand grip 30 formed of sheet or strap metal and secured to the shaft 28 by welding.

The shaft 28 is a composite formed of a rod 32, a resilient sleeve 34, and a plurality of metal bushings 36.

The rod 32 is preferably made from spring steel so that some resiliency is inherent in the rod 32 which forms the core of the composite shaft.

The sleeve 34 is formed of suitable resilient matter, preferably rubber.

The metal bushings 36 are formed of hard steel to resist wear imposed by movement of the hitch pin relative to the clevis.

The hitch pin 22 is assembled by first welding the handgrip 30 to the rod 32. The resilient sleeve 34 is then slid over the rod 32 in abutting relation to the handgrip 30. The metal bushings are then slid one by one over the resilient bushing. The shaft components are secured in place by a rivet 38 extending through the last positioned bushing 38, the resilient sleeve 34 and the rod 32.

It will thus be understood that the present invention provides a durable hitch assembly having a hitch pin which absorbs the impact shock between the coupling members.

The hitch pin is easily and economically manufactured. The resilient sleeve takes up much of the shock. The rod is capable of flexing due to the material from which it is formed. The hard steel bushings provided an excellent wear surface. Additionally, since there is some limited movement of the individual bushings further shock is absorbed by such movement.

What is claimed is:

1. A hitch pin for use in a trailer hitch assembly which is adapted to absorb shock imposed thereon comprising a core, said core consisting of an elongated cylindrical member formed of spring steel, a handgrip rigidly secured to one end of said core, a resilient sleeve mounted on said core and extending the full length thereof, a plurality of bushings slidably positioned on said sleeve, said bushings completely covering said sleeve, and a fastener extending through said core, sleeve, and the bushing adjacent the end of said core to secure the bushings thereon in a manner so that the bushings can move relative to each other.

2. A hitch pin as set forth in claim 1 wherein said resilient sleeve is formed of rubber.

3. A hitch pin as set forth in claim 1 wherein said bushings are formed of hard steel.

4. A hitch pin as set forth in claim 1 including means for locking said pin in place in a hitch assembly.

5. A hitch pin as set forth in claim 4 wherein said locking means comprises a cotter pin removably received in a bore in said pin.

* * * * *